(12) United States Patent
Niemi

(10) Patent No.: US 9,654,642 B2
(45) Date of Patent: *May 16, 2017

(54) CONFERENCING SYSTEM

(71) Applicant: Nokia Corporation, Espoo (FI)

(72) Inventor: Aki Niemi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 268 days.

This patent is subject to a terminal disclaimer.

(21) Appl. No.: 14/293,137

(22) Filed: Jun. 2, 2014

(65) Prior Publication Data

US 2014/0341088 A1    Nov. 20, 2014

Related U.S. Application Data

(63) Continuation of application No. 12/838,947, filed on Jul. 19, 2010, now Pat. No. 8,787,889, which is a
(Continued)

(30) Foreign Application Priority Data

Aug. 28, 2002   (GB) .................................. 0219947.9

(51) Int. Cl.
```
H04M 3/56      (2006.01)
H04L 29/12     (2006.01)
H04W 8/26      (2009.01)
H04W 80/04     (2009.01)
H04W 72/04     (2009.01)
```

(52) U.S. Cl.
CPC ........ *H04M 3/56* (2013.01); *H04L 29/12009* (2013.01); *H04L 29/12018* (2013.01); *H04L 61/10* (2013.01); *H04W 8/26* (2013.01); *H04W 80/04* (2013.01); *H04W 72/042* (2013.01); *H04W 72/0426* (2013.01)

(58) Field of Classification Search
None
See application file for complete search history.

(56) References Cited

U.S. PATENT DOCUMENTS

| 6,018,360 A | 1/2000 | Stewart et al. ................. 348/15 |
| 6,104,706 A | 8/2000 | Richter et al. |

(Continued)

FOREIGN PATENT DOCUMENTS

| EP | 1 039 697 A1 | 9/2000 |
| EP | 1 294 165 A1 | 3/2003 |

(Continued)

OTHER PUBLICATIONS

Miladinovic, I. et al.; Multiparty Conference Signalling using the Session Initiation Protocol (SIP); 2002; whole document (8 pages); URL: http://www.ibk.tuwien.ac.at/ftw-a1/02_04_24_PAPER_INC_2002.pdf.

*Primary Examiner* — Christine Duong
(74) *Attorney, Agent, or Firm* — Harrington & Smith

(57) ABSTRACT

Administering conferencing resources in a communications system comprising a plurality of user equipments and a server. A first user equipment transmits a first message to the server. The first message comprises a request for a resource configured for sustaining a conference call. The server allocates a network address identifying the resource and transmits a second message comprising the network address to the first user equipment.

30 Claims, 3 Drawing Sheets

Related U.S. Application Data continuation of application No. 10/645,848, filed on Aug. 22, 2003, now Pat. No. 7,792,519.

(56) References Cited

U.S. PATENT DOCUMENTS

| | | |
|---|---|---|
| 6,501,739 B1 | 12/2002 | Cohen |
| 6,577,622 B1 | 6/2003 | Schuster et al. |
| 6,870,916 B2 | 3/2005 | Henrikson et al. |
| 6,961,416 B1 | 11/2005 | Summers et al. ....... 379/202.01 |
| 7,184,418 B1 * | 2/2007 | Baba .................. H04L 12/2602 |
| | | 370/331 |
| 7,792,519 B2 | 9/2010 | Niemi |
| 2001/0053131 A1 | 12/2001 | Geens |
| 2002/0059088 A1 | 5/2002 | Whalen et al. ................... 705/8 |
| 2002/0061779 A1 | 5/2002 | Maehiro |
| 2002/0078150 A1 | 6/2002 | Thompson et al. .......... 709/204 |
| 2002/0078153 A1 | 6/2002 | Chung et al. |
| 2002/0093948 A1 | 7/2002 | Dertz et al. |
| 2002/0098831 A1 | 7/2002 | Castell et al. |
| 2003/0026214 A1 | 2/2003 | Iveland et al. |
| 2003/0123488 A1 | 7/2003 | Riikonen et al. |
| 2004/0037406 A1 | 2/2004 | Gourraud |
| 2004/0037407 A1 | 2/2004 | Gourraud et al. ....... 379/202.01 |
| 2004/0072593 A1 | 4/2004 | Robbins et al. .............. 455/560 |
| 2004/0246332 A1 | 12/2004 | Crouch ...................... 348/14.08 |
| 2005/0097222 A1 * | 5/2005 | Jiang ................ H04L 29/06027 |
| | | 709/245 |

FOREIGN PATENT DOCUMENTS

| | | |
|---|---|---|
| KR | 20030045879 A | 6/2003 |
| KR | 20040012132 A | 2/2004 |
| WO | WO 02/21816 A1 | 3/2002 |

\* cited by examiner

CONFERENCING SYSTEM

CROSS-REFERENCE TO RELATED APPLICATIONS

This application is a continuation of copending U.S. patent application Ser. No. 12/838,947 filed on Jul. 19, 2010, which is a continuation of U.S. patent application Ser. No. 10/645,848 filed on Aug. 22, 2003, both of which are incorporated herein by reference in their entirety.

FIELD OF THE INVENTION

The present invention relates to a method and apparatus for setting up conference calls in communication systems, and in particular but not exclusively to wireless communication systems.

BACKGROUND OF THE INVENTION

The concept of conference calls in public switched telephone networks (PSTN) is well known. PSTN conferences are typically set up by a first participant calling a specific customer support number and being supplied with a conference bridge number and a PIN code. The first participant can then provide this information to any other potential participants. The participants wishing to join the call would each dial the conference bridge number, and supply the PIN code on demand, and would subsequently be admitted to the conference call.

As an alternative, the Internet could conceivably be used to arrange conference calls. A specific web site could be accessed by a first participant, and a bridge number and PIN code could be obtained. The first participant would then be able to provide the details to other participants.

Both of these procedures allow for a mobile terminal to be involved in the conference call. However, both procedures have two main disadvantages. Firstly, a conference call must be planned in advance. The various participants must contact each other so that they each know when the call is due to take place and can dial the conference bridge number at that time. Secondly, the participants themselves need to organize for the bridge number and the PIN code to be distributed to all participants.

Various models have been proposed for providing conferencing services in third generation Internet Protocol Multimedia Subsystem (IMS) wireless communication systems, including an IETF draft entitled, "Models for Multi Party Conferencing in SIP", by J. Rosenberg and H. Schulzrinne. Each of the models in this draft uses Session Initiation Protocol (SIP) messaging. The SIP protocol is discussed in Internet Standards RFC 3261 and RFC 2543. Some of the models are described briefly hereinafter.

The first model, known as "end system mixing", requires that one terminal involved in a conference call performs the mixing (merging) of signals and media streams sent to and from other terminals in the call. FIG. 1A is a depiction of a three-way call using this model. In this example, users A and B are involved in a two-way call. At some point during the call, user A decides to bring user C into the call. To do this, user A calls user C using a completely separate SIP call. There is no call set up between B and C. Instead, A receives media streams from both B and C and mixes them. Terminal A sends a stream containing the streams of A and B to terminal C, and a stream containing A's and C's streams to terminal B. In this model, terminals B and C are unaware from a SIP perspective that the call involves more than two parties.

In the case of a call involving more than three terminals, more than one terminal may perform mixing and signalling to sustain the call. For instance, as an extension of the above-described example, user C may decide to invite a fourth user D into the conference call. User C would then call user D and terminal C would perform the mixing of the streams it receives from terminal A with its own stream, and send the combined stream to D, and mix its own stream with that of D and send this to A. This set-up is shown in FIG. 1B.

Serious disadvantages of this model are that when a mixing terminal leaves the call, the conference must end, and that there is no way for a mixing terminal to determine whether a signalling message sent to it was intended for that terminal alone or for all terminals in the conference.

A further model, using dial-in conference servers, closely mirrors the PSTN system described above. One participant defines a URI (uniform resource identifier) to identify a conference call, and sends it to other participants. The participants then each call the server, using the conference URI, which maintains point-to-point SIP relationships with each participant that calls in. The server receives media from each participant, mixes them, and sends out the appropriate mixed stream to each participant separately. This model is depicted in FIG. 2, which shows four users A-D taking part in a conference call.

Dial-in conference servers are versatile in that they can be used for pre-arranged conferences or for ad hoc conferences. However, this model suffers from the fact that it is possible for the same URI to be used for more than one conference. This would cause conference sessions to be mixed.

It is an object of the present invention to provide a solution to one or more of the previously-stated problems.

SUMMARY OF THE INVENTION

According to a first aspect of the present invention, a method is provided for a first user equipment to administer conferencing resources in a communications system comprising at least one other user equipment and a server, the method comprising: transmitting from the first user equipment to the server a first message comprising a request for a resource configured to sustain a conference call; receiving by the first user equipment from the server a second message comprising a network address identifying the resource configured to sustain the conference call which has been allocated by the server; in response to receiving the second message, transmitting a first request from the first user equipment directly to the resource at the network address; in response to receiving an acknowledgment of the first request directly from the resource, transmitting from the first user equipment to at least one other user equipment a third message comprising the network address; and in response to receiving a notification that the resource sends out directly to the at least one other user equipment an acknowledgment of a second request directly sent from the at least one terminal, the first user equipment initiating a connection from the first user equipment to the at least one other user equipment via the resource to establish a conference call between the first user equipment and the at least one other user equipment; wherein the third message comprising the network address is transmitted by direct communication from the first user equipment to the at least one other user equipment.

Advantageously, the method provides a technical effect that allows for conferences to be set up on an ad hoc basis so that the conferences need not be prearranged. In addition, the method prevents the problem of overlapping conference sessions. This problem is overcome by providing for a server to allocate a resource for a conference, and a corresponding address for that resource. In this way, an address can be unique to a particular conference at a given time.

A further advantage of the present invention is that it allows for the use of standard SIP message in the establishment of a conference call. Furthermore, no significant user configuration is required in the allocation of conferencing resources.

Preferably a user transmits the network address from the first user equipment to one or more other user equipments of other users that will take part in the conference call. Preferably connections are initiated between the first user equipment, the one or more other user equipments, and the network address to establish the conference call.

According to a second aspect of the present invention, a non-transitory computer readable medium is encoded with instructions for performing a method that, when executed on a computer, comprises: transmitting from a first user equipment to a server a first message comprising a request for a resource configured to sustain a conference call; receiving by the first user equipment from the server a second message comprising a network address identifying the resource configured to sustain the conference call which has been allocated by the server; in response to receiving the second message, transmitting a first request from the first user equipment directly to the resource at the network address; in response to receiving an acknowledgment of the first request directly from the resource, transmitting from the first user equipment to at least one other user equipment a third message comprising the network address; and in response to receiving a notification that the resource sends out directly to the at least one other user equipment an acknowledgment of a second request directly sent from the at least one terminal, the first user equipment initiating a connection from the first user equipment to the at least one other user equipment via the resource to establish a conference call between the first user equipment and the at least one other user equipment; wherein the third message comprising the network address is transmitted by direct communication from the first user equipment to the at least one other user equipment.

According to a third aspect of the present invention, a user equipment comprises at least one processor and at least one memory including computer program code for one or more programs, the at least one memory and the computer program code being configured, with the at least one processor, to cause the user equipment to perform at least the following: transmitting to a server a first message comprising a request for a resource configured to sustain a conference call; receiving from the server a second message comprising a network address identifying the resource configured to sustain the conference call which has been allocated by the server; in response to receiving the second message, transmitting a first request directly to the resource at the network address; in response to receiving an acknowledgment of the first request directly from the resource, transmitting to at least one other user equipment a third message comprising the network address; and in response to receiving a notification that the resource sends out directly to the at least one other user equipment an acknowledgment of a second request directly sent from the at least one terminal, initiating a connection to the at least one other user equipment via the resource to establish a conference call between the user equipment and the at least one other user equipment; wherein the third message comprising the network address is transmitted by direct communication from the first user equipment to the at least one other user equipment.

According to a fourth aspect of the present invention, a conference server is provided for administering conferencing resources, the conference server comprising at least one processor and at least one memory including computer program code for one or more programs, the at least one memory and the computer program code being configured, with the at least one processor, to cause the conference server to perform at least the following: receiving from a first user equipment a first message comprising a request for a resource that is configured for sustaining a conference call; allocating a network address identifying a resource that is configured for sustaining the conference call; and transmitting to the first user equipment a second message comprising the network address.

The server could be provided at a single location, or by functionality that is distributed between two or more locations.

According to a fifth aspect of the present invention, a communications system is provided comprising: a conference server for administering conferencing resources in a communications system comprising a plurality of terminal, the conference server comprising: a receiver unit for receiving from a first terminal a first message comprising a request for a resource capable of sustaining a conference call; an allocation unit for allocating a network address identifying a resource capable of sustaining the conference call; and a transmission unit for transmitting, to the first terminal a second message comprising the network address; and a plurality of terminals including the first terminal.

BRIEF DESCRIPTION OF THE DRAWINGS

The present invention will now be described by way of example with reference to the accompanying drawings, in which.

DETAILED DESCRIPTION OF THE INVENTION

The invention is described hereinafter with reference to a non-limiting set of embodiments.

In particular, the invention is described in relation to SIP signalling in a 3G IMS mobile communications network. However, the invention is not limited to such signalling or such a network.

Figure 1A:
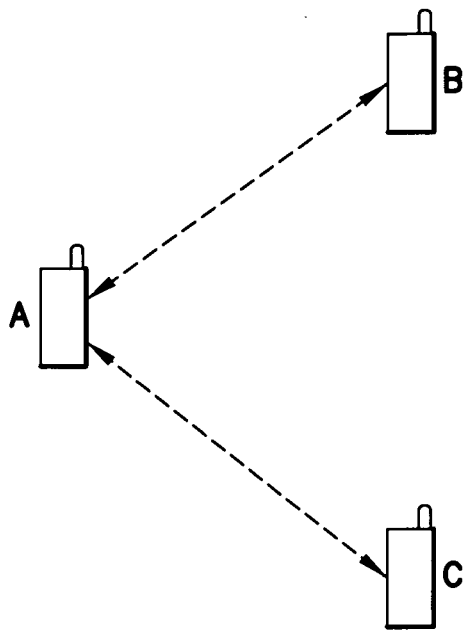
FIG. 1A shows a first prior art model for a conferencing system.
Figure 1B:
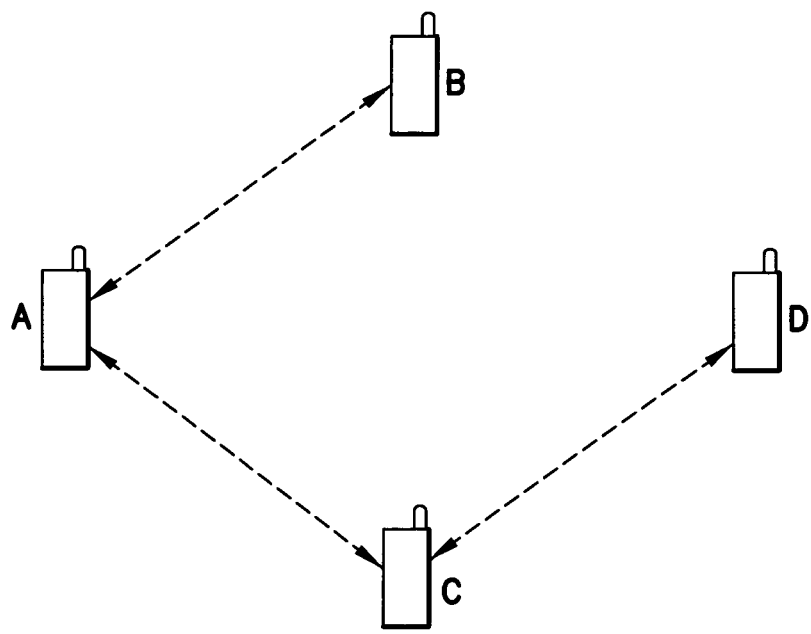
FIG. 1B shows a second prior art model for a conferencing system.
Figure 2:
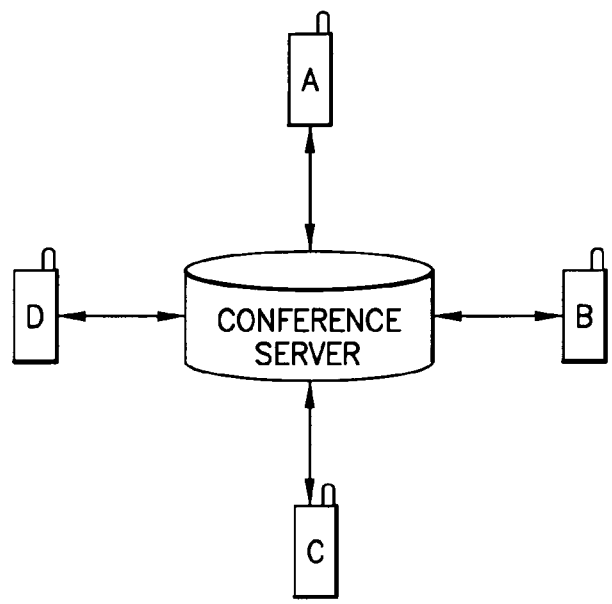
FIG. 2 shows a prior art dial-in conferencing system.
Figure 3:
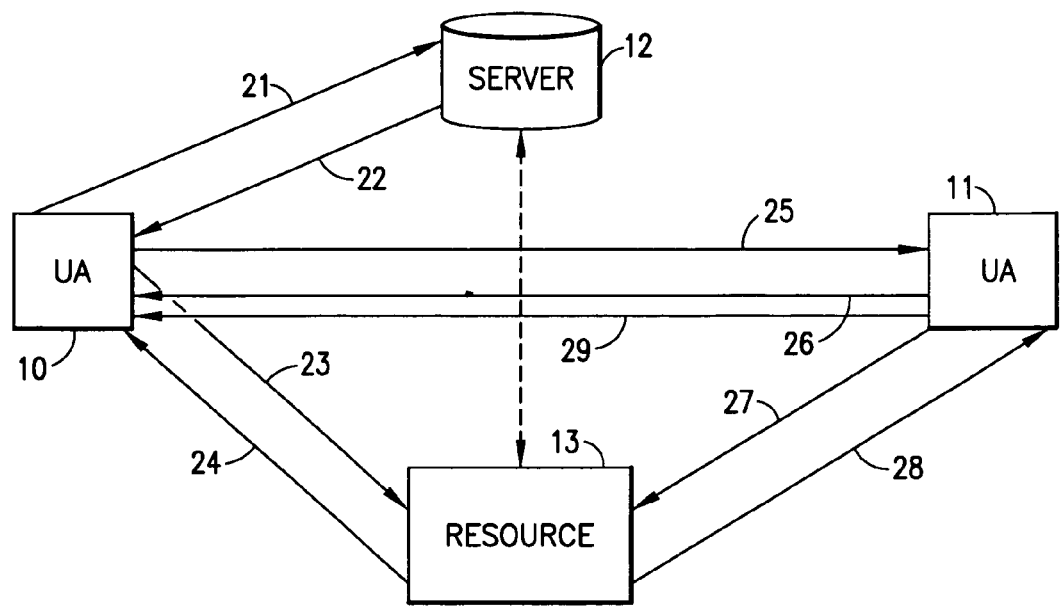
FIG. 3 shows an illustrative conferencing system according to one set of embodiments of the invention.

Referring to FIG. 3, two user agents 10 and 11 are shown. A first user, using user agent 10, wishes to start a conference call involving user agent 11 and sends a SIP INVITE message 21 to a well-known URI at an operator to initiate the conferencing process. That URI could be stored by the user agent 10. The INVITE message 21 indicates that user agent 10 wishes to initiate a conference, and the Request-URI could suitably take the form:

sip:conferences@sonera.fi

The INVITE message could include details of the type of conference required, for example a preferred data rate. These details could be contained in the media components listed in the Session Description Protocol (SDP) payload of the INVITE 21.

The message 21 is received at a conference server 12 which is preferably a generic user agent server. At this stage, the server 12 could authenticate the conference request by transmitting a SIP message containing an authentication challenge to the user agent 10 requesting details such as a username and a password. In this case, the user would then need to provide such details, i.e. valid authentication credentials, in order for the conference request to be authorised.

Either in response to receiving message 21, or in response to receiving valid authentication information from user agent 10, the server 12 allocates a dynamic SIP URI to be used for the requested conference. The dynamic URI identifies a resource 13 that is available to be used for supporting the requested conference according to the specifications listed by the first user in the INVITE 21. The network is arranged to route to the resource, or the unit that provides the resource, communications directed to that address. To facilitate this, the server is preferably arranged to allocate addresses for conferencing according to a pre-set pattern so that they will all refer to a suitable conferencing resource. The server 12 may reserve this resource so that it remains available until the requested conference begins. Alternatively, no resource may be reserved by the server 12 but instead an available resource could be located at the time when the requested conference is initiated. The resource is capable of establishing point-to-point connections with a terminal of each participant in a conference call. It can merge the traffic signals it receives from each terminal and transmit the merged signals to the other terminals that are parties to the conference call. Those traffic signals could carry voice data or other data such as video or graphical (e.g. white boarding) data. The resource could be data handling capacity, bandwidth or any other resource necessary for sustaining a conference call. The resource could be provided by physical equipment such as a part of a server.

The dynamic URI is transmitted to user agent 10 by conference server 12 in a SIP message 22. The message 22 is preferably a redirection message with a code in the 3xx range, and the URI is preferably contained in the contact field of the message. An illustrative example of the form that the contact field could suitably take is:

Contact: <sip:DKLSKX87KKJ989SHFKJH@conference.sonera.fi>

On receipt of the redirection message including the allocated URI, the user agent 10 then transmits an INVITE message 23 to the URI. The URI identifies the reserved conference resource 13, and responsive to receiving the INVITE message 23, the resource 13 sends an acknowledgement, such as a 200 OK message 24, back to user agent 10.

Once user agent 10 receives the 200 OK message, the first user can then refer the allocated URI to a second user at user agent 11. A further message, such as a SIP REFER message 25, including the URI is transmitted from user agent 10 to user agent 11. The REFER could suitably take the form:
REFER sip:user_b@pp.radiolinja.fi SIP/2.0
with the following header:

Refer-To: sip:DKLSKX87KKJ989SHFKJH@conference.sonera.fi; Method=INVITE

Alternatively, the URI could be sent from the first user to the second user in another way.

By the above mechanism, a user can reserve a conference resource on the fly. Without any significant input on the part of the user, other participants can be connected together to form a conference call.

In response to receiving the REFER message from user agent 10, user agent 11 transmits an acknowledgement, such as a 202 accepted message 26, back to user agent 10.

User agent 11 now transmits a request message, such as an INVITE message 27, to the reserved resource 13, in response to which the resource 13 sends an acknowledgement, such as a 200 OK message 28, to user agent 11. The server 12 and resource 13 are able to communicate with each other. In this way, the server can acquire authentication information obtained by the resource from a user so that each user can be authenticated before being allowed to join the conference. For example, it may be desirable to check that a user has a subscription enabling him to take part in conferences. Details of subscriptions could be contained in authentication information. Alternatively, or additionally, a user may be required to input a PIN for transmission to the resource 13 to confirm his identity for security reasons.

Following message 28, an acknowledgement, such as a NOTIFY message 29 with response code 200 OK, is sent from user agent 11 to user agent 10, and the conference may begin.

It will be apparent that user agent 10 can also send or REFER the dynamic URI to a number of other users so that they can take part in the conference. A further alternative is that the REFER message 25 could be directed to the conference URI. In other words, instead of referring user B to the conference, the conference could be referred to user B. The same set of messages could be used as described above, but in this case they are used with dial-out semantics.

A summary of the messages required to set up a conference according to a preferred embodiment of the invention is given below.
21 INVITE to sip:conferences@sonera.fi
22 3xx redirection including dynamic URI
23 INVITE to URI
24 200 OK
25 REFER to UA 11
26 202 accepted
27 INVITE to URI
28 200 OK
29 NOTIFY with response code 200 OK The mechanism described above can also facilitate dial-in conferences. In the dial-in case, the mechanism would function in essentially the same manner as described above except that the conference URI would he delivered to prospective participants in a different way, for example via an Instant Message or email, rather than using a REFER message to invite them.

Figure 4:
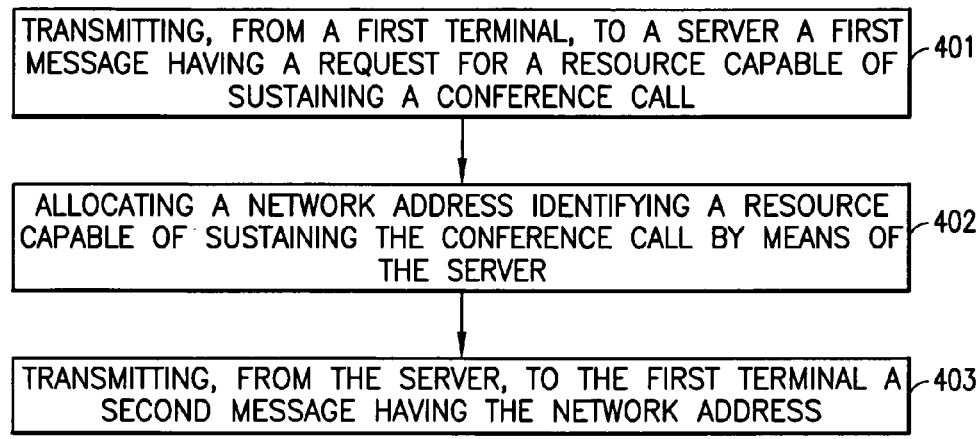
FIG. 4 illustrates a flow chart presenting steps for administering conference resources in a communications system.
Figure 5:
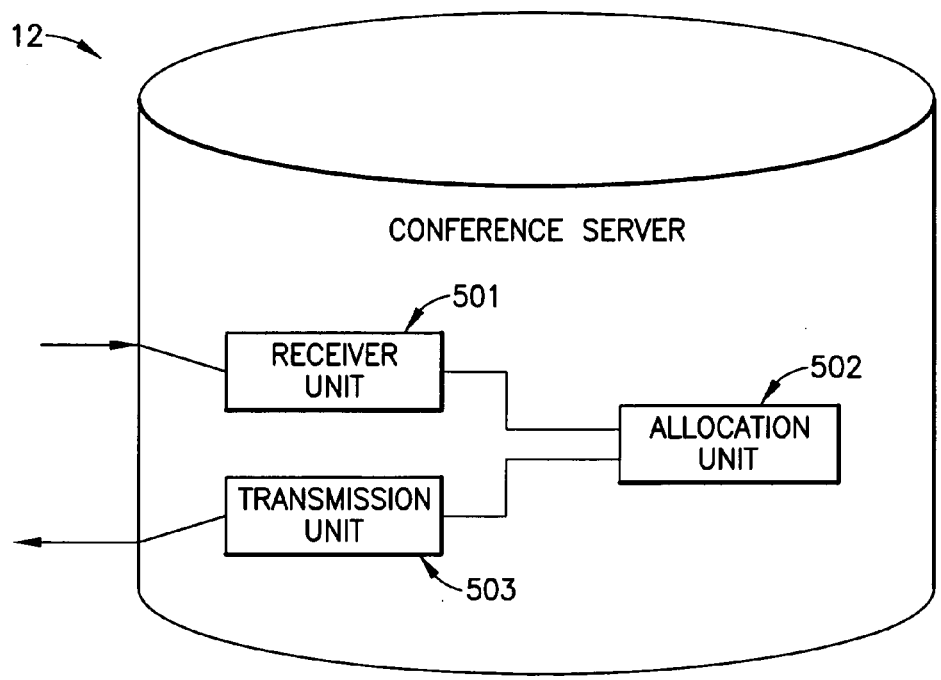
FIG. 5 shows the elements of the conference server, according to one set of exemplary embodiment of the invention.

As illustrated in FIG. 4, the process of administering conference resources in a communications is provided for at least one set of embodiments of the present invention. As generally described previously, a first message is transmitted to a server, requesting a resource capable of sustaining a conference call, in step 401. Thereafter, the server allocates a network address identifying a resource capable of sustaining a conference call, in step 402. The server transmits a second message to the first terminal having the network address, in step 403. The component units that provide the previously discussed functionality are illustrated in FIG. 5, namely the Receiver Unit 501, the Allocation Unit 502 and the Transmission Unit 503.

The applicant draws attention to the fact that the present invention may include any feature or combination of features disclosed herein either implicitly or explicitly, or any generalization thereof, without limitation to the scope of any definitions set out above. In view of the foregoing description it will be evident to a person skilled in the art that various modifications may be made within the scope of the invention.

What is claimed is:

1. A method comprising:
    transmitting from a first user equipment to a server a first message comprising a request for a resource configured to sustain a conference call;
    receiving by the first user equipment from the server a second message comprising a network address identifying the resource configured to sustain the conference call which has been allocated by the server;
    in response to receiving the second message, transmitting a first request from the first user equipment directly to the resource at the network address;
    in response to receiving an acknowledgment of the first request directly from the resource, transmitting from the first user equipment to at least one other user equipment a third message comprising the network address; and
    in response to receiving a notification that the resource sends out directly to the at least one other user equipment an acknowledgment of a second request directly sent from the at least one other user equipment, the first user equipment initiating a connection from the first user equipment to the at least one other user equipment via the resource to establish a conference call between the first user equipment and the at least one other user equipment;
    wherein the third message comprising the network address is transmitted by direct communication from the first user equipment to the at least one other user equipment.

2. The method of claim 1 wherein the second message specifies that the resource is being allocated a respective address of a corresponding plurality of addresses, the respective address being unique to the conference call at any given time; and wherein each of the corresponding plurality of addresses are allocated according to a pre-set pattern such that the respective address refers to a resource that is available for the conference call at the given time.

3. The method of claim 2 wherein the first message comprises a first session initiation protocol invite message.

4. The method of claim 3 further comprising:
    sending a second session initiation protocol invite message comprising a dynamic uniform resource identifier to the resource.

5. The method of claim 2 wherein the second message comprises a session initiation protocol 3xx redirection message.

6. The method of claim 5 wherein the session initiation protocol 3xx redirection message comprises a contact header containing the dynamic uniform resource identifier.

7. The method of claim 2 further comprising receiving a session initiation protocol 200 OK message from the resource.

8. The method of claim 4 wherein the third message comprises a session initiation protocol refer message to the user agent.

9. The method of claim 8 wherein the session initiation protocol refer message comprises a refer-to header comprising the dynamic uniform resource identifier.

10. The method of claim 9 further comprising receiving a session initiation protocol accepted message.

11. A non-transitory computer readable medium encoded with instructions for performing a method when executed on a computer, the method comprising:
    transmitting from a first user equipment to a server a first message comprising a request for a resource configured to sustain a conference call;
    receiving by the first user equipment from the server a second message comprising a network address identifying the resource configured to sustain the conference call which has been allocated by the server;
    in response to receiving the second message, transmitting a first request from the first user equipment directly to the resource at the network address;
    in response to receiving an acknowledgment of the first request directly from the resource, transmitting from the first user equipment to at least one other user equipment a third message comprising the network address; and
    in response to receiving a notification that the resource sends out directly to the at least one other user equipment an acknowledgment of a second request directly sent from the at least one other user equipment, the first user equipment initiating a connection from the first user equipment to the at least one other user equipment via the resource to establish a conference call between the first user equipment and the at least one other user equipment;
    wherein the third message comprising the network address is transmitted by direct communication from the first user equipment to the at least one other user equipment.

12. The non-transitory computer readable medium of claim 11 wherein the second message specifies that the resource is being allocated a respective address of a corresponding plurality of addresses, the respective address being unique to the conference call at any given time; and wherein each of the corresponding plurality of addresses are allocated according to a pre-set pattern such that the respective address refers to a resource that is available for the conference call at the given time.

13. The non-transitory computer readable medium of claim 12 wherein the first message comprises a first session initiation protocol invite message.

14. The non-transitory computer readable medium of claim 13 further comprising instructions for sending a second session initiation protocol invite message comprising a dynamic uniform resource identifier to the resource.

15. The non-transitory computer readable medium of claim 12 wherein the second message comprises a session initiation protocol 3xx redirection message.

16. The non-transitory computer readable medium of claim 15 wherein the session initiation protocol 3xx redirection message comprises a contact header containing the dynamic uniform resource identifier.

17. The non-transitory computer readable medium of claim 12 further comprising receiving a session initiation protocol 200 OK message from the resource.

18. The non-transitory computer readable medium of claim 14 wherein the third message comprises a session initiation protocol refer message.

19. The non-transitory computer readable medium of claim 18 wherein the session initiation protocol refer message comprises a refer-to header comprising the dynamic uniform resource identifier.

20. The non-transitory computer readable medium of claim 19 further comprising receiving a session initiation protocol accepted message.

21. A user equipment comprising at least one processor and at least one memory including computer program code for one or more programs, the at least one memory and the computer program code configured, with the at least one processor, to cause the user equipment to perform at least the following:
- transmit to a server a first message comprising a request for a resource configured to sustain a conference call;
- receive from the server a second message comprising a network address identifying the resource configured to sustain the conference call which has been allocated by the server;
- in response to receiving the second message, transmit a first request directly to the resource at the network address;
- in response to receiving an acknowledgment of the first request directly from the resource, transmit to at least one other user equipment a third message comprising the network address; and
- in response to receiving a notification that the resource sends out directly to the at least one other user equipment an acknowledgment of a second request directly sent from the at least one other user equipment, initiate a connection to the at least one other user equipment via the resource to establish a conference call between the user equipment and the at least one other user equipment;
- wherein the third message comprising the network address is transmitted by direct communication from the first user equipment to the at least one other user equipment.

22. The user equipment of claim 21 wherein the second message specifies that the resource is being allocated a respective address of a corresponding plurality of addresses, the respective address being unique to the conference call at any given time; and wherein each of the corresponding plurality of addresses are allocated according to a pre-set pattern such that the respective address refers to a resource that is available for the conference call at the given time.

23. The user equipment of claim 21 wherein the first message comprises a first session initiation protocol invite message.

24. The user equipment of claim 23 wherein the computer program code is further configured to cause the user equipment to send a second session initiation protocol invite message comprising the dynamic uniform resource identifier to the resource.

25. The user equipment of claim 21 wherein the second message comprises a session initiation protocol 3xx redirection message.

26. The user equipment of claim 25 wherein the session initiation protocol 3xx redirection message comprises a contact header containing a dynamic uniform resource identifier.

27. The user equipment of claim 21 wherein the computer program code is further configured to cause the user equipment to receive a session initiation protocol 200 OK message from the resource.

28. The user equipment of claim 26 wherein the third message comprises a session initiation protocol refer message.

29. The user equipment of claim 28 wherein the session initiation protocol refer message comprises a refer-to header comprising the dynamic uniform resource identifier.

30. The user equipment of claim 29 wherein the computer program code is further configured to cause the user equipment to receive a session initiation protocol accepted message.

* * * * *